US012151979B2

(12) United States Patent
Cui et al.

(10) Patent No.: US 12,151,979 B2
(45) Date of Patent: Nov. 26, 2024

(54) HIGHLY ORIENTED NANOMETER MAX PHASE CERAMIC AND PREPARATION METHOD FOR MAX PHASE IN-SITU AUTOGENOUS OXIDE NANOCOMPOSITE CERAMIC

(71) Applicant: Institute of Metal Research Chinese Academy of Sciences, Shenyang (CN)

(72) Inventors: Yuyou Cui, Shenyang (CN); Xi Xie, Shenyang (CN); Chunguang Bai, Shenyang (CN); Rui Yang, Shenyang (CN)

(*) Notice: Subject to any disclaimer, the term of this patent is extended or adjusted under 35 U.S.C. 154(b) by 726 days.

(21) Appl. No.: 17/272,342

(22) PCT Filed: Aug. 19, 2019

(86) PCT No.: PCT/CN2019/101342
§ 371 (c)(1),
(2) Date: Feb. 28, 2021

(87) PCT Pub. No.: WO2020/042949
PCT Pub. Date: Mar. 5, 2020

(65) Prior Publication Data
US 2021/0317045 A1 Oct. 14, 2021

(30) Foreign Application Priority Data
Aug. 31, 2018 (CN) .......................... 201811006676.6

(51) Int. Cl.
*C04B 35/645* (2006.01)
*C04B 35/56* (2006.01)
*C04B 35/64* (2006.01)

(52) U.S. Cl.
CPC ...... *C04B 35/5618* (2013.01); *C04B 35/5615* (2013.01); *C04B 35/6455* (2013.01);
(Continued)

(58) Field of Classification Search
CPC .............................................. C04B 35/56–597
See application file for complete search history.

(56) References Cited

U.S. PATENT DOCUMENTS

2013/0052438 A1* 2/2013 Hu ...................... C04B 35/5603
264/430

FOREIGN PATENT DOCUMENTS

CN            106187199 A  * 12/2016  ....... C04B 35/58014

OTHER PUBLICATIONS

CN-106187199-A (Guo) Dec. 7, 2016 (English language machine translation). [online] [retrieved Jul. 11, 2024]. Retrieved from: Espacenet. (Year: 2016).*

(Continued)

*Primary Examiner* — Erin Snelting
(74) *Attorney, Agent, or Firm* — Novoclaims Patent Services LLC; Mei Lin Wong

(57) ABSTRACT

A highly oriented nanometer MAX phase ceramic and a preparation method for a MAX phase in-situ autogenous oxide nanocomposite ceramic. The raw materials comprise a MAX phase ceramic nano-lamellar powder body or a blank body formed by the nano-lamellar powder body, wherein MAX phase ceramic nano-lamellar particles in the powder body or the blank meet the particle size being between 20-400 nm, and the oxygen content is between 0.0001%-20% by mass; MAX phase grains in the ceramic obtained after the raw materials are sintered are lamellar or spindle-shaped, the lamellar structure having a high degree of orientation. Utilizing special properties of the nano-lamellar MAX powder body, orientation occurs during compression and deformation to obtain a lamellar structure similar to that in a natural pearl shell, and such a structure has a high bearing capacity and resistance to external loads and crack propagation, just like a brick used in a building.

12 Claims, 3 Drawing Sheets

(52) U.S. Cl.
CPC ............... *C04B 2235/3217* (2013.01); *C04B 2235/3418* (2013.01); *C04B 2235/3817* (2013.01); *C04B 2235/3826* (2013.01); *C04B 2235/3843* (2013.01); *C04B 2235/5292* (2013.01); *C04B 2235/5445* (2013.01); *C04B 2235/5454* (2013.01); *C04B 2235/6562* (2013.01); *C04B 2235/6567* (2013.01); *C04B 2235/6581* (2013.01); *C04B 2235/663* (2013.01); *C04B 2235/666* (2013.01); *C04B 2235/781* (2013.01); *C04B 2235/785* (2013.01); *C04B 2235/85* (2013.01)

(56) References Cited

OTHER PUBLICATIONS

Dahlqvist et al. "Phase stability of Ti2AlC upon oxygen incorporation: A first-principles investigation." Physical Review B 81, 024111 (2010). (Year: 2010).*

* cited by examiner

HIGHLY ORIENTED NANOMETER MAX PHASE CERAMIC AND PREPARATION METHOD FOR MAX PHASE IN-SITU AUTOGENOUS OXIDE NANOCOMPOSITE CERAMIC

FIELD OF INVENTION

The present invention relates to the field of ceramic materials, in particular to a method for preparing highly oriented nano MAX phase ceramics and MAX phase in-situ self-generating oxide nano-composite ceramics.

DESCRIPTION OF RELATED ARTS

MAX phase ceramics (such as $Ti_3SiC_2$, $Ti_2AlC$, $Nb_2AlC$, and etc.) are a class of processable ceramics with a nano-ternary layered structure and many unique and excellent properties, and the characteristics of the crystal structure of MAX phase ceramics can be described as: a layer of pure A atoms is inserted into the crystalline densely packed M atoms, and X atoms are filled into the gap of an octahedral structure composed of M. Wherein the M atom refers to a transition group metal element, the A atom is a group A element, and the X atom can be C and N elements. The ceramics with this kind of crystal structure have covalent bonds, metal bonds and ionic bonds at the same time, so they both have the properties of ceramics and metals. For example, the high melting point, oxidation resistance and corrosion resistance of ceramic materials, the conductivity, processability, damage resistance, thermal shock resistance of metals, and the radiation resistance of nano-ceramics. However, as a ceramic structural material, the strength of MAX phase ceramics is lower than most of the densified engineered ceramics, such as oxide ceramics, nitride ceramics, carbide ceramics, etc. Although MAX phase ceramics have a nano-layered structure that makes their fracture toughness stronger than most ceramic materials, this layered structure is limited to the inside of the crystal grains. The grain orientation has no obvious orientation because there are many nucleation sites and growth direction in the reaction synthesis. As a result, there is no orientation on the crystal grains at macroscopic level, and the fracture toughness cannot be greatly improved. At the same time, most MAX phase ceramics have very coarse crystal grains size due to the high reaction synthesis temperature. Moreover, as a material that can be synthesized by self-propagating combustion, a large amount of heat is released during the reaction synthesis, resulting in uncontrollable reaction and by-product, and it is very difficult to control the crystal grain size. It is difficult to obtain nanocrystalline ceramics with high density, excellent mechanical properties and oxidation resistance through reaction control. After the grain size is increased, the mechanical strength of MAX phase ceramics is also significantly reduced.

Ordinary ceramics have poor toughness and low strength due to internal defects. Nano powders can significantly reduce the sintering temperature due to their high activity and large surface area. After sintering, the material has a high density and good composition uniformity. Compared with ordinary ceramics, the strength, toughness and superplasticity of ceramics are greatly improved. Therefore, the research and development of MAX-phase nanoceramics technology is very important to improve the performance and application prospects of MAX-phase ceramics. Nano-composite ceramics, due to the introduction of the second phase particles distributed in the grain boundaries, have deflection, absorption, and bridging effects on cracks, which help to improve the toughness and high-temperature strength of ceramic materials. However, the existing nano-composite ceramics are mainly strengthened and toughened by adding external second-phase particles. The nano-composite ceramic prepared by this method is affected by insufficient second phase dispersion and poor interface matching and chemical affinity, and the performance is far inferior to that of the in-situ growth of the nano two-phase particle toughened ceramics with phase interface matching on the nano ceramic matrix.

SUMMARY OF THE PRESENT INVENTION

An object of the present invention is to provide a method for preparing highly oriented nano MAX phase ceramics and MAX phase in-situ self-generating oxide nano-composite ceramics which can solve the problem that the performance of the existing nano composite ceramics is not as good as the in-situ growth of nano two-phase particles with phase interface matching on the nano ceramic matrix.

The technical solution of the present invention is:

A method for preparing highly oriented nano MAX phase ceramics and MAX phase in-situ self-generating oxide nano-composite ceramics, and the details are as follows:

(1) a raw material is made of MAX phase ceramic nanosheet layered powder or embryo body formed by nanosheet layered powder, the nanosheet layered particles of MAX phase ceramics in the powder or embryo body meet the particle size of 20-400 nanometers, and the oxygen content of 0.0001%-20% by mass fraction;

(2) after sintering the raw materials, obtaining a ceramic in which the MAX phase crystal grains in ceramics are lamellar or spindle-shaped, and the sheet layers are highly oriented.

In the method for preparing highly oriented nano MAX phase ceramics and MAX phase in-situ self-generating oxide nano-composite ceramics, the nano MAX phase ceramics are distributed in an orderly stack of bricks and MAX phase oxides are distributed at the grain boundaries of the nano MAX phase ceramic grains, and the MAX phase grain size is 20-400 nm.

In the method for preparing highly oriented nano MAX phase ceramics and MAX phase in-situ self-generating oxide nano-composite ceramics, in terms of mass percentage, in nano MAX phase ceramics and MAX phase oxide nanocomposite ceramics, the content of nano MAX phase oxide is 0.0002%-40%, and the rest is nano MAX phase ceramics.

In the method for preparing highly oriented nano MAX phase ceramics and MAX phase in-situ self-generating oxide nano-composite ceramics, the sintering method utilizes nano powder or embryo body directly for sintering with pressure, or the sintering method utilizes nano powder or embryo body directly for pre-compression molding followed by sintering without pressure.

In the method for preparing highly oriented nano MAX phase ceramics and MAX phase in-situ self-generating oxide nano-composite ceramics, the sintering method utilizes nano powder or embryo body directly for sintering with pressure by using hot pressing sintering method, hot isostatic pressing sintering method or spark plasma sintering method, wherein:

(1) hot pressing sintering method the nanosheet layered powder or embryo body is directly loaded into a graphite mold, and hot-pressed sintered is carried out in the graphite mold, the sintering temperature is 500-2000° C., the sintering pressure is 1-200 MPa, the holding time is 10-3600 minutes, and the heating rate is 1-100° C. per minute, sintering is carried out under vacuum or argon atmosphere;

(2) hot isostatic pressing sintering method put the nanosheet layered powder or embryo body directly into the hot isostatic pressing jacket, and then vacuum and seal the jacket; hot isostatic pressing sintering in the jacket, the sintering temperature is 500-2000° C., the sintering pressure is 1-800 MPa, the holding time is 10-3600 minutes, and the heating rate is 1-100° C. per minute, sintering is carried out under vacuum or argon atmosphere;

(3) spark plasma sintering method put the nanosheet layered powder or embryo body directly into the sintering mold, and sinter after applying a large pulse current, the sintering temperature is 300-1800° C., the sintering pressure is 1-400 MPa, the holding time is 5-600 minutes, and the heating rate is 1-500° C. per minute, sintering is carried out under vacuum or argon atmosphere.

In the method for preparing highly oriented nano MAX phase ceramics and MAX phase in-situ self-generating oxide nano-composite ceramics, the sintering method utilizes nano powder or embryo body directly for pre-compression molding followed by sintering without pressure, one of the followings is employed:

(1) put the nano powder or embryo body into a pressing mold, apply pressure to the mold to process densification, the pressure applied is 5-1000 MPa, and then use the obtained compressed product to sintering without pressure;

(2) put the nano powder or embryo body into the cold isostatic pressing jacket, and then vacuum and seal the jacket; process cold isostatic pressing sintering in the jacket for densification, cold isostatic pressing temperature is 0-600° C., the cold isostatic pressing pressure is 1-800 MPa, the holding time is 10-3600 minutes, and the heating rate is 1-100° C. per minute, then use the obtained compressed product from the jacket to process sintering without pressure;

(3) put the nano powder or embryo body into a jacket or use the embryo body to carry out rolling, the rolling pressure is 10-1000 MPa, the rolling temperature is 0-600° C., and then use the obtained molded product of MAX phase ceramic nanosheet-layered powder or embryo body after rolling to process sintering without pressure;

(4) use the obtained pre-press-formed MAX phase ceramic nanosheet-layered product to process sintering, the sintering method is: put the powder into a container that can withstand the sintering temperature, and then vacuum the container or pass protective gas, or put the powder directly into a furnace body that is vacuumed or passed with protective gas to process sintering without pressure.

In the method for preparing highly oriented nano MAX phase ceramics and MAX phase in-situ self-generating oxide nano-composite ceramics, the equipment used for sintering is muffle furnace, induction heating furnace, microwave heating furnace, and infrared heating furnace, the sintering temperature is 300-2000° C. and the sintering time is 10-9600 minutes.

In the method for preparing highly oriented nano MAX phase ceramics and MAX phase in-situ self-generating oxide nano-composite ceramics, when preparing the oriented MAX phase/oxide nanocomposite ceramics, the oxide content in the MAX phase/oxide nanocomposite ceramics is controlled by the oxygen content of the nanosheet-layered powder or the embryo body used to prepare the MAX phase ceramics, the obtained crystal grain size is controlled by the particle size of the nanosheet-layered particles and the powder sintering parameters, and the degree of orientation of the obtained ceramic is controlled by the different combinations and parameters of the pressing method and the sintering method.

The design idea of the present invention is as follows:

According to the present invention, a simple method for preparing highly oriented nano MAX phase ceramics and MAX phase in-situ self-generating oxide nano-composite ceramics is employed. The special properties of the nanosheet layered MAX powder is used, the orientation occurs during compression deformation, and so the layered structure similar to the natural pearl shell can be obtained. This structure is like the bricks used in the buildings, which has high bearing capacity, resistance to external loads and crack propagation. At the same time, no violent exothermic reaction occurs during the sintering process, and the nano MAX phase ceramics will not grow to a larger size significantly and retain the characteristics of nano ceramics.

According to the present invention, through using the MAX phase ceramic nanosheet layered powder that has been modified by surface oxygen absorption, nano MAX phase/oxide composite ceramics with small dispersion distribution, high chemical affinity, precise and controllable content can be grown in situ in the matrix of nano MAX phase ceramics during sintering. This type of ceramic has excellent room temperature and high temperature mechanical properties. The precise and controllable content of the present invention means that the performance of the material can be optimized and designed to meet different requirements for different service environments of the material, the advantages of the material are effectively used, and the service adaptability is improved.

The advantageous and beneficial effects of the present invention are as follows:

1. The process route and preparation method of the present invention are simple, which is easy to batch and large-scale continuous production. Based on the same principles and raw materials, a wide range of technical routes can be achieved, and its technical adaptability and portability are good.

2. The method of the present invention is compatible with all MAX phase systems, and can prepare oriented ceramics, nano ceramics, and nano composite ceramics of all MAX phase types.

3. The ceramic prepared by the present invention has high mechanical properties, and the oriented structure of the nano-sheet layers leads to a significant improvement in the mechanical properties of the ceramic.

4. According to the present invention, through selecting MAX phase ceramic nanosheet layered powders with completely oxygen-free and highly oxygen-absorbing surfaces, the preparation of pure and highly oriented nano MAX phase ceramics and MAX phase oxide nano composite ceramics is realized.

5. The present invention can adjust the oxide content in the nano-composite ceramics through the oxygen content, thereby adjusting the mechanical properties, and realizing designable mechanical properties.

DETAILED DESCRIPTION OF THE PREFERRED EMBODIMENT OF THE PRESENT INVENTION

Figure 1:
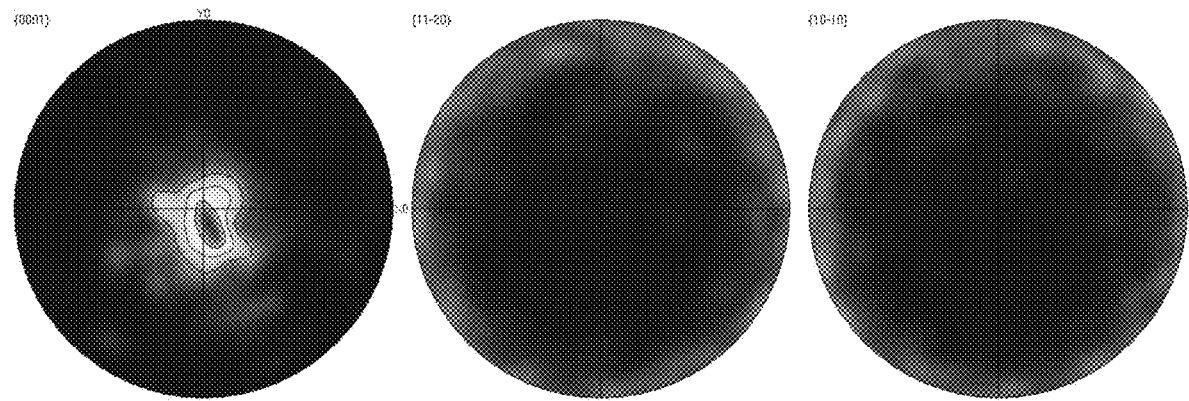
FIG. 1 is a pole figure obtained by electron backscatter diffraction (EBSD) characterization on the pressure surface of the final sintered specimen. (a) is the pole figure of the crystal plane 001 in the Ti$_2$AlC phase crystal in the Ti$_2$AlC/Al$_2$O$_3$ nanocomposite ceramic on the diffraction projection plane; (b) is the pole figure of the 11-20 crystal plane in the Ti$_2$AlC phase crystal in the Ti$_2$AlC/Al$_2$O$_3$ nanocomposite ceramic on the diffraction projection plane; (c) is the pole figure of the 10-10 crystal plane in the Ti$_2$AlC phase crystal in the Ti$_2$AlC/Al$_2$O$_3$ nanocomposite ceramic on the diffraction projection plane.

In the implementation process of the embodiment, a preparation method for highly oriented nano MAX phase ceramics and MAX phase in-situ self-generating oxide nano-composite ceramics of the present invention is as follows:

(1) Prepare a raw material which is made of MAX phase ceramic nanosheet layered powder or embryo body formed by nanosheet layered powder, the nanosheet layered particles of MAX phase ceramics in the powder or embryo body meet the particle size between 20~400 nanometers (preferably 100~200 nanometers), and the oxygen content between 0.0001%~20% by mass fraction (preferably 0.02%~10%).

(2) After sintering the raw materials, obtain a ceramic in which a MAX phase crystal grains in the ceramic are lamellar-shaped or spindle-shaped, and the sheet layers of the ceramic are highly oriented.

(3) The preparation method can utilize nano powder or embryo body directly for sintering with pressure. For example, a hot-pressing sintering method is employed: the nanosheet layered powder or the embryo body is directly loaded into a graphite mold, and is hot-pressed sintered inside the graphite mold, the sintering temperature is 500~2000° C., the sintering pressure is 1~200 MPa, the holding time is 10~3600 minutes, and the heating rate is 1~100° C. per minute, the sintering process is carried out under vacuum or argon atmosphere. The hot isostatic pressing sintering method is employed: the nanosheet layered powder or embryo body is put directly into a hot isostatic pressing jacket, and then the jacket is vacuumed and sealed. The nanosheet layered powder or embryo body is sintered inside the jacket by hot isostatic pressing sintering, the sintering temperature is 500~2000° C., the sintering pressure is 1~800 MPa, the holding time is 10~3600 minutes, and the heating rate is 1~100° C. per minute, the sintering process is carried out under vacuum or argon atmosphere. The spark plasma sintering method is employed: the nanosheet layered powder or embryo body is put directly into a sintering mold and is sintered under the application of a large pulse current, the sintering temperature is 300~1800° C., the sintering pressure is 1~400 MPa, the holding time is 5~600 minutes, and the heating rate is 1~500° C. per minute, the sintering process is carried out under vacuum or argon atmosphere. The sintering with pressure with nano powder or embryo body is not limited to the methods as listed above. Any sintering method with pressure that can apply external effects to the powder to deform and sinter at the same time is also within the protection scope of the present invention.

(4) The sintering method which utilizes the nano powder or the embryo body directly for pre-compression molding, followed by sintering without pressure, is employed. For examples: put the nano powder or embryo body into a pressing mold, apply pressure to the mold to process densification, the pressure applied is 5~1000 MPa, and then use the obtained compressed product to carry out sintering without pressure. Besides, the nano powder or embryo body can also be put into the cold isostatic pressing jacket, and then vacuum and seal the jacket; process cold isostatic pressing sintering of the nano powder or embryo body inside the jacket for densification, the cold isostatic pressing temperature is 0-600° C., the cold isostatic pressing pressure is 1~800 MPa, the holding time is 10~3600 minutes, and the heating rate is 1~100° C. per minute. Then take out the compressed product from the jacket to process sintering without pressure. Moreover, the nano powder or the embryo body can be put into a jacket or the embryo body can be used directly to carry out rolling, the rolling pressure is 10~1000 MPa, the rolling temperature is 0~600° C., and then use the obtained molded product of MAX phase ceramic nanosheet-layered powder or the embryo body after rolling to process sintering without pressure. The nano-powder or embryo body with pre-compression molding is not limited to the methods listed above, and any pressurizing method that can apply external effects to the powder to deform is also within the protection scope of the present invention. The method of sintering without pressure can be performed on the obtained pre-compression molding of MAX phase nanosheet layered products. The sintering method can be as follows: put the powder into a container that can withstand the sintering temperature, and then vacuum the container or pass protective gas (such as argon gas), or put the powder directly into a furnace body that is vacuumed or passed with protective gas (such as argon gas) for sintering without pressure. The equipment used for sintering can be any equipment that can heat the sample to process sintering and densification, such as muffle furnace, induction heating furnace, microwave heating furnace, and infrared heating furnace. The sintering temperature is 300~2000° C. and the sintering time is 10~9600 minutes. The method of sintering without pressure on the pre-compression molding of nano powder is not limited to the methods listed above. Any sintering method that can apply a temperature field to the powder is within the protection scope of the present invention.

(5) When preparing oriented nano MAX phase ceramics and MAX phase/oxide nano composite ceramics by the above method, in particular, whether it is nano MAX phase ceramics or MAX phase/oxide nanocomposite ceramics, and the oxide content in MAX phase/oxide nanocomposite ceramics, the oxygen content is adjusted and controlled by the oxygen content of the nanosheet layered powder or the embryo body of MAX phase ceramics used to prepare the above ceramics, the obtained crystal grain size is controlled by the particle size of the nanosheet particles and the powder sintering parameters, the degree of ceramic orientation obtained is jointly controlled by the different combinations and parameters of the pressing method and the sintering method in the preparation method.

The present invention is further described in detail with the embodiments and accompanying drawings as following:

Embodiment 1

According to this embodiment, a preparation method of highly oriented nano MAX phase ceramics and MAX phase in-situ self-generating oxide nano-composite ceramics is as follows:

Weigh 200 grams of MAX phase ceramic nanosheet layered powder named $Ti_2AlC$, the particle size of the powder is 180 nanometers, and the oxygen content of the powder is 8% by mass fraction. The nanosheet layered powder is directly loaded into a graphite mold, and hot pressing sintering method is employed. The hot-pressed sintered is carried out with the powder inside the graphite mold, the sintering temperature 1250° C., the sintering pressure is 50 MPa, the holding time is 60 minutes, and the heating rate is 5° C. per minute, and the sintering process is carried out under vacuum condition. After the sintering process, $Ti_2AlC/Al_2O_3$ nano-composite ceramics is obtained, and the alumina content accounts for 12% of the material by mass fraction. The compressive strength of the material is 2200 MPa, which is much higher than the 400~1000 MPa strength of ordinary $Ti_2AlC$, and the fracture toughness is 8-9 $MPa \cdot m^{1/2}$, which is much higher than the 5-6 $MPa \cdot m^{1/2}$ fracture toughness value of ordinary $Ti_2AlC$, and the high temperature performance is: a compressive strength reaches 400 MPa at 1000° C.

As shown in FIG. 1, the pole figure obtained by electron backscatter diffraction (EBSD) characterization on the pressure surface of the final sintered sample is illustrated. It can be seen from this figure that the direction of the crystal plane 001 of the $Ti_2AC$ phase is almost completely concentrated in the center of the projection plane, and the direction of the crystal plane 11-20 and the direction of the crystal plane 10-10 are almost completely parallel to the projection plane, and this shows the orientation of the material.

Figure 2:
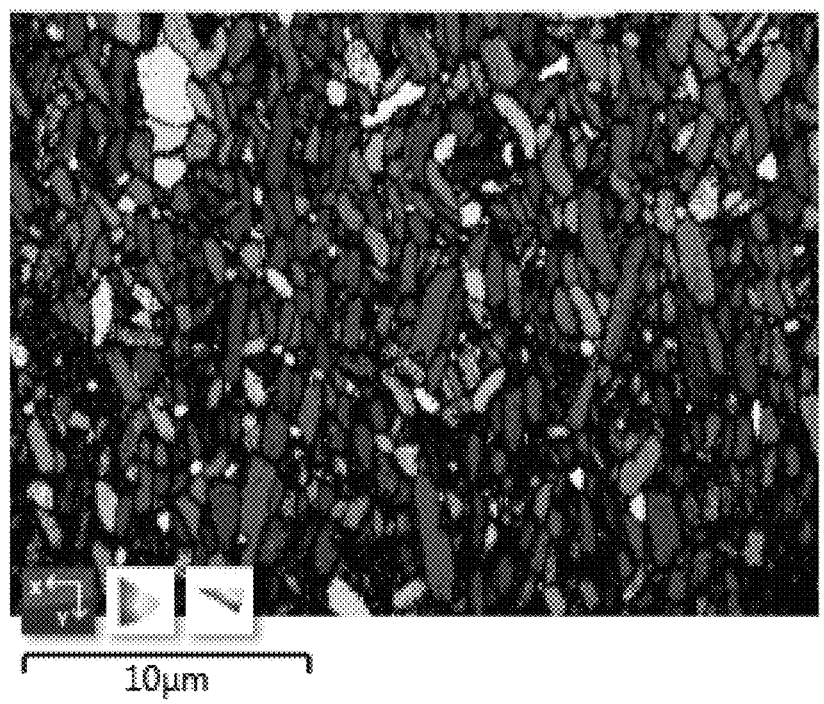
FIG. 2 is the structure image obtained by electron backscatter diffraction characterization on the vertical pressure surface of the final sintered sample.

As shown in FIG. 2, the structure image obtained by electron backscatter diffraction characterization on the vertical pressure surface of the final sintered sample is illustrated. It can be seen from this figure that the material structure and grains have obvious orientation.

Figure 3:
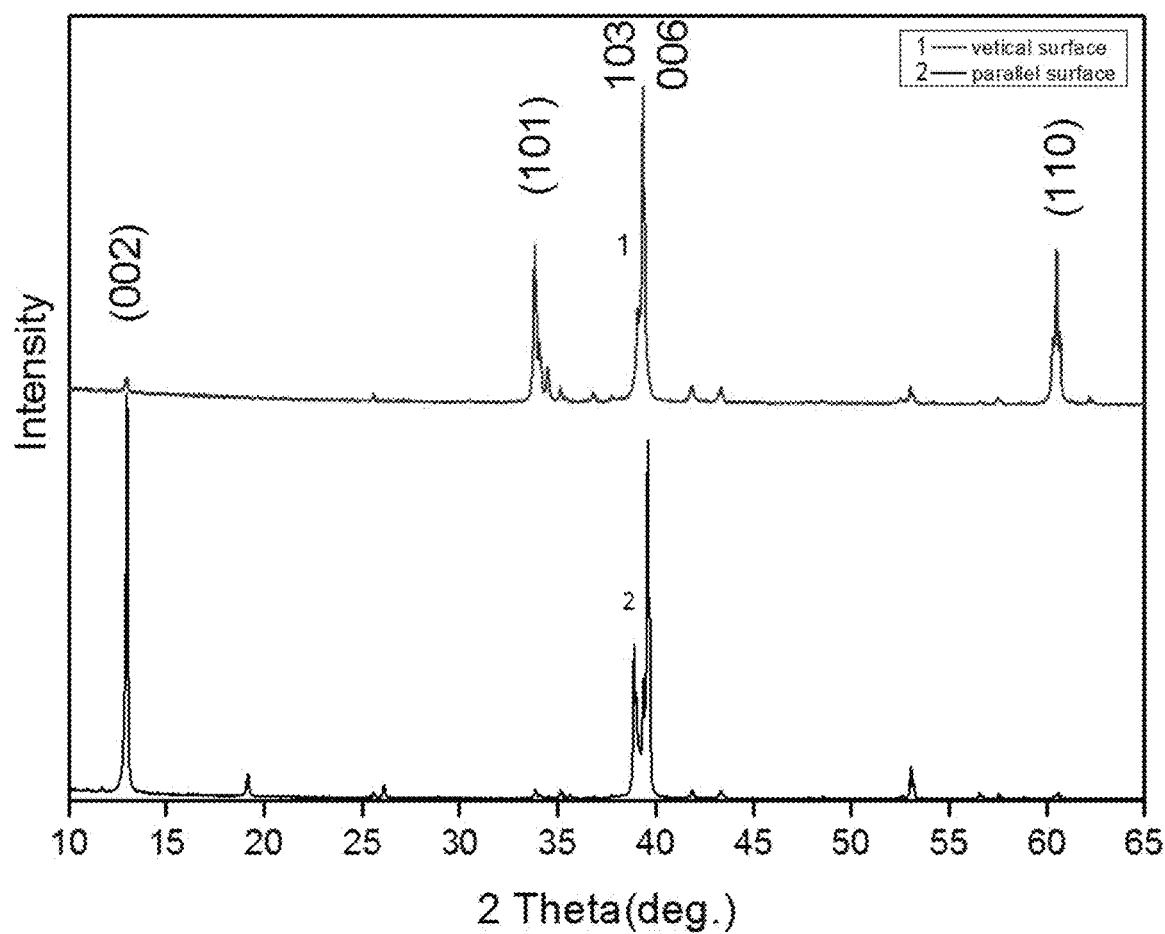
FIG. 3 illustrates X-ray crystal diffraction data of parallel pressure surface and vertical pressure surface of the final sintered sample. In the figure, the abscissa '2 Theta' represents the diffraction angle (deg.), and the ordinate 'Intensity' represents the intensity; '1-vertical surface' represents the vertical pressure surface, and '2-parallel surface' represents the parallel pressure surface.

As shown in FIG. 3, the X-ray crystal diffraction data of parallel pressure surface and vertical pressure surface of the final sintered specimen is illustrated. It can be seen from the figure that the main crystal planes of the $Ti_2AC$ phase parallel to the pressure surface are (001) crystal planes including (002) and (006) crystal planes. The peak position of the crystal plane (001) of the $Ti_2AC$ phase perpendicular to the pressure surface basically disappears. The main crystal planes are crystal planes (101) such as crystal planes (101), (110), (103), and etc. It shows obvious orientation of the material in different directions.

According to this embodiment, in the ceramic obtained after sintering the raw materials, the MAX phase crystal grains are lamellar-shaped or spindle-shaped, the nano MAX phase ceramics are distributed in an orderly stack of bricks and MAX phase oxides are distributed at the grain boundaries of the nano MAX phase ceramic grains. The MAX phase grain size is 50~300 nanometers in thickness and 0.5~3 microns in width.

Embodiment 2

According to this embodiment, a preparation method of highly oriented nano MAX phase ceramics and MAX phase in-situ self-generating oxide nano-composite ceramics is as follows:

Weigh 500 grams of MAX phase ceramic nanosheet layered powder named $Ti_3AlC_2$, the particle size of the powder is 200 nanometers, and the oxygen content of the powder is 5% by mass fraction. The nanosheet layered powder is put directly into a stainless steel jacket, and the jacket is vacuumed and sealed. The sealed jacket is put into a hot isostatic pressing furnace for sintering. The sintering temperature is 1100° C., the sintering pressure is 200 MPa, the holding time is 120 minutes, and the heating rate is 5° C. per minute, and the sintering atmosphere is argon gas. After the sintering process, $Ti_3AlC_2/Al_2O_3$ nano-composite ceramics is obtained, and the alumina content accounts for 8% of the material by mass fraction. The compressive strength of the material is 1800 MPa, and the fracture toughness is 14-17 $MPa \cdot m^{1/2}$, which is much higher than the 7-8 $MPa \cdot m^{1/2}$ fracture toughness value of ordinary $Ti_3AlC_2$, and the high temperature performance is: a compressive strength reaches 350 MPa at 1000° C.

Figure 4:
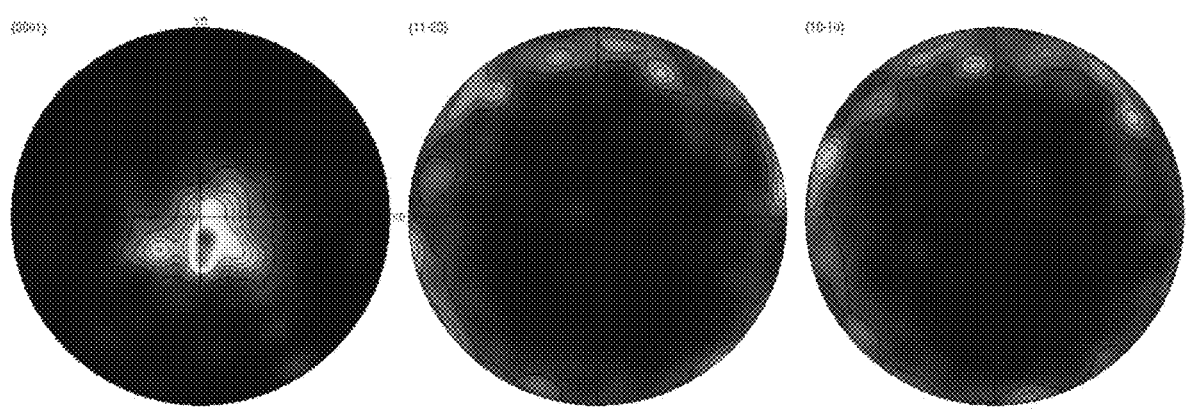
FIG. 4 is a pole figure obtained by electron backscatter diffraction (EBSD) characterization of the pressure surface of the final sintered specimen. (a) is the pole figure of the crystal plane 001 in the Ti$_3$AlC$_2$ phase crystal in the Ti$_3$AlC$_2$/Al$_2$O$_3$ nanocomposite ceramic on the diffraction projection plane; (b) is the pole figure of the 11-20 crystal plane in the Ti$_3$AlC$_2$ phase crystal in the Ti$_3$AlC$_2$/Al$_2$O$_3$ nanocomposite ceramic on the diffraction projection plane; (c) is the pole figure of the 10-10 crystal plane in the Ti$_3$AlC$_2$ phase crystal in the Ti$_3$AlC$_2$/Al$_2$O$_3$ nanocomposite ceramic on the diffraction projection plane.

As shown in FIG. 4, the pole figure obtained by electron backscatter diffraction (EBSD) characterization on the pressure surface of the final sintered sample is illustrated. It can be seen from this figure that the direction of the crystal plane 001 of the $Ti_3AlC_2$ phase is almost completely concentrated in the center of the projection plane, and the direction of the crystal plane 11-20 and the direction of the crystal plane 10-10 are almost completely parallel to the projection plane, and this shows the orientation of the material.

According to this embodiment, in the ceramic obtained after sintering the raw materials, the MAX phase crystal grains are lamellar-shaped or spindle-shaped, the nano MAX phase ceramics are distributed in an orderly stack of bricks and MAX phase oxides are distributed at the grain boundaries of the nano MAX phase ceramic grains. The MAX phase grain size is 100~400 nanometers in thickness and 1~10 microns in width.

Figure 5:
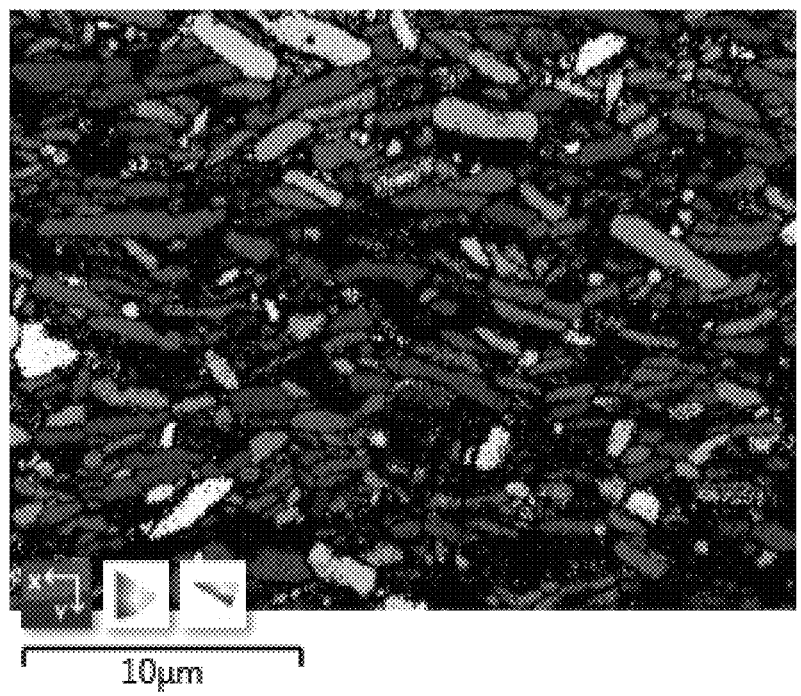
FIG. 5 is the structure image obtained by electron backscatter diffraction characterization on the vertical pressure surface of the final sintered sample.

As shown in FIG. 5, the structure image obtained by electron backscatter diffraction characterization on the vertical pressure surface of the final sintered sample is illustrated. It can be seen from the image that the material structure and crystal grains have obvious orientation, and the lamellar structure of the material is very obvious and complete.

Embodiment 3

Weigh 1 kg of MAX phase ceramic nanosheet layered powder named $Ti_3SiC_2$, the oxygen content of the powder is 6% by mass fraction, and the particle size of the powder is 80 nanometers.

The nanopowder is put into an aluminum alloy cold isostatic pressing jacket, then the jacket is vacuumed and sealed, and process cold isostatic pressing and the nanopowder is densified inside the jacket, the cold isostatic pressing temperature is 400° C., and the cold isostatic pressing pressure is 250 MPa, the pressure holding time is 360 minutes, and the heating rate is 5° C. per minute. Then the pressed powder product is taken out of the jacket. Put the pressed embryo body into an alumina crucible and send it to a vacuum furnace for sintering at a sintering temperature of 1300° C. and a sintering time of 180 minutes. After the sintering process, $Ti_3AlC_2/SiO_2$ nano-composite ceramics is obtained, and the silica content accounts for 10% of the material by mass fraction. The compressive strength of the material is 1900 MPa, and the fracture toughness is 12~15 MPa·m$^{1/2}$, which is much higher than the 7~8 MPa·m$^{1/2}$ fracture toughness value of ordinary $Ti_3SiC_2$, and the high temperature performance is: a compressive strength reaches 320 MPa at 1000° C.

According to this embodiment, in the ceramic obtained after sintering the raw materials, the MAX phase crystal grains are lamellar-shaped or spindle-shaped, the nano MAX phase ceramics are distributed in an orderly stack of bricks and MAX phase oxides are distributed at the grain boundaries of the nano MAX phase ceramic grains. The MAX phase grain size is 100~400 nanometers in thickness and 1~10 microns in width.

What is claimed is:

1. A method for preparing oriented nano MAX phase ceramic or MAX phase in-situ self-generating oxide nano-composite ceramic, comprising the steps of:
   (1) preparing a raw material of a powder form or an embryo form, wherein the powder form is MAX phase ceramic nanosheet layered powder, the embryo form is embryo body formed by MAX phase ceramic nanosheet layered powder, and particles in a MAX phase ceramic nanosheet layer of the powder form or the embryo form meet a particle size of 20-400 nanometers, and an oxygen content of 0.0001%-20% by mass fraction;
   (2) sintering the raw material, obtaining a ceramic of which MAX phase crystal grains in the ceramic are lamellar-shaped or spindle-shaped, and sheet layers of the ceramic are oriented,
   wherein
   the nano MAX phase ceramic is distributed in an orderly stack of bricks and MAX phase oxides are distributed at grain boundaries of nano MAX phase ceramic grains, and a MAX phase grain size is 20-400 nm.

2. The method for preparing oriented nano MAX phase ceramic or MAX phase in-situ self-generating oxide nano-composite ceramic according to claim 1, further comprising:
   a sintering method which utilizes the powder form or the embryo form directly for sintering with pressure, or a sintering method which utilizes the powder form or the embryo form directly for pre-compression molding followed by sintering without pressure is employed.

3. The method for preparing oriented nano MAX phase ceramic or MAX phase in-situ self-generating oxide nano-composite ceramic according claim 2, wherein an oxide content in the oriented nano MAX phase ceramic or MAX phase in-situ self-generating oxide nano-composite ceramic is controlled by an oxygen content of the powder form or the embryo form being used, an obtained crystal grain size is controlled by a particle size of the nanosheet-layered particles and powder sintering parameters, and a degree of orientation of the obtained ceramic is controlled by different combinations and parameters of a pressing method and the sintering method.

4. The method for preparing oriented nano MAX phase ceramic or MAX phase in-situ self-generating oxide nano-composite ceramic according to claim 1, further comprising:
   a sintering method which utilizes the powder form or the embryo form directly for sintering with pressure is carried out by using a hot pressing sintering process, a hot isostatic pressing sintering process or a spark plasma sintering process, wherein:
   (1) in the hot pressing sintering process:
   the powder form or the embryo form is directly loaded into a graphite mold, and hot pressing sintering is carried out with the powder form or the embryo form inside the graphite mold,
   a sintering temperature is 500-2000° C., a sintering pressure is 1-200 MPa, a holding time is 10-3600 minutes, and a heating rate is 1-100° C. per minute, the sintering process is carried out under vacuum or argon atmosphere;
   (2) in the hot isostatic pressing sintering process:
   the powder form or the embryo form is directly put into a hot isostatic pressing jacket, and then the jacket is vacuumed and sealed; the hot isostatic pressing sintering process is carried out with the powder or the embryo body inside the jacket,
   the sintering temperature is 500-2000° C., the sintering pressure is 1-800 MPa, the holding time is 10-3600 minutes, and the heating rate is 1-100° C. per minute, the sintering process is carried out under vacuum or argon atmosphere;
   (3) in the spark plasma sintering process:
   the powder form or the embryo form is put directly into a sintering mold, and a pulse current is applied for the sintering process,
   the sintering temperature is 300-1800° C., the sintering pressure is 1-400 MPa, the holding time is 5-600 minutes, and the heating rate is 1-500° C. per minute, the sintering process is carried out under vacuum or argon atmosphere.

5. The method for preparing oriented nano MAX phase ceramic or MAX phase in-situ self-generating oxide nano-composite ceramic according claim 4, wherein an oxide content in the oriented nano MAX phase ceramic or MAX phase in-situ self-generating oxide nano-composite ceramic is controlled by an oxygen content of the powder form or the embryo form being used to prepare the MAX phase ceramic, an obtained crystal grain size is controlled by a particle size of the nanosheet-layered particles and powder sintering parameters, and a degree of orientation of the obtained ceramic is controlled by different combinations and parameters of a pressing method and the sintering method.

6. The method for preparing oriented nano MAX phase ceramic or MAX phase in-situ self-generating oxide nano-composite ceramic according to claim 1, further comprising:
   a sintering method which utilizes the powder form or the embryo form directly for pre-compression molding followed by sintering without pressure, which comprises one of the following:
   (1) put the powder form or the embryo form into a pressing mold, apply pressure to the mold to process densification, a pressure applied is 5-1000 MPa, and then obtain a compressed product to process sintering without pressure;
   (2) put the nano form or the embryo form into a cold isostatic pressing jacket, and then vacuum and seal the jacket; process cold isostatic pressing sintering with the powder form or the embryo form inside the jacket for densification, a cold isostatic pressing temperature is 0-600° C., a cold isostatic pressing pressure is 1-800 MPa, a holding time is 10-3600 minutes, and a heating rate is 1-100° C. per minute, then obtain a compressed product from the jacket to process sintering without pressure;

(3) put the powder form or the embryo form into a jacket or use the embryo form directly to carry out rolling, a rolling pressure is 10-1000 MPa, a rolling temperature is 0-600° C., and then obtain a molded product of powder form or the embryo form after rolling to process sintering without pressure;

(4) obtain a MAX phase ceramic nanosheet-layered product formed by pre-compression to process sintering, the sintering method is: put the MAX phase ceramic nanosheet-layered product formed by pre-compression into a container that can withstand a sintering temperature, and then vacuum the container or pass protective gas, or put the MAX phase ceramic nanosheet-layered product formed by pre-compression directly into a furnace body that is vacuumed or passed with protective gas to process sintering without pressure.

7. The method for preparing oriented nano MAX phase ceramic or MAX phase in-situ self-generating oxide nano-composite ceramic according to claim 6, wherein an equipment used for sintering is muffle furnace, induction heating furnace, microwave heating furnace, or infrared heating furnace, the sintering temperature is 300-2000° C. and the sintering time is 10-9600 minutes.

8. The method for preparing oriented nano MAX phase ceramic or MAX phase in-situ self-generating oxide nano-composite ceramic according claim 7, wherein an oxide content in the oriented nano MAX phase ceramic or MAX phase in-situ self-generating oxide nano-composite ceramic is controlled by an oxygen content of the powder form or the embryo form being used to prepare the MAX phase ceramic, an obtained crystal grain size is controlled by a particle size of the nanosheet-layered particles and powder sintering parameters, and a degree of orientation of the obtained ceramic is controlled by different combinations and parameters of a pressing method and the sintering method.

9. The method for preparing oriented nano MAX phase ceramic or MAX phase in-situ self-generating oxide nano-composite ceramic according claim 6, wherein an oxide content in the oriented nano MAX phase ceramic or MAX phase in-situ self-generating oxide nano-composite ceramic is controlled by an oxygen content of the powder form or the embryo form being used to prepare the MAX phase ceramic, an obtained crystal grain size is controlled by a particle size of the nanosheet-layered particles and powder sintering parameters, and a degree of orientation of the obtained ceramic is controlled by different combinations and parameters of a pressing method and the sintering method.

10. The method for preparing oriented nano MAX phase ceramic or MAX phase in-situ self-generating oxide nano-composite ceramic according claim 1, wherein an oxide content in the oriented nano MAX phase ceramic or MAX phase in-situ self-generating oxide nano-composite ceramic is controlled by an oxygen content of the powder form or the embryo form being used, an obtained crystal grain size is controlled by a particle size of the nanosheet-layered particles and powder sintering parameters, and a degree of orientation of the obtained ceramic is controlled by different combinations and parameters of a pressing method and a sintering method.

11. A method for preparing oriented nano MAX phase ceramic or MAX phase in-situ self-generating oxide nano-composite ceramic, comprising the steps of:

(1) preparing a raw material of a powder form or an embryo form, wherein the powder form is MAX phase ceramic nanosheet layered powder, the embryo form is embryo body formed by MAX phase ceramic nanosheet layered powder, and particles in a MAX phase ceramic nanosheet layer of the powder form or the embryo form meet a particle size of 20-400 nanometers, and an oxygen content of 0.0001%-20% by mass fraction;

(2) sintering the raw material, obtaining a ceramic of which MAX phase crystal grains in the ceramic are lamellar-shaped or spindle-shaped, and sheet layers of the ceramic are oriented, wherein in terms of mass percentage, in the nano MAX phase ceramic or the MAX phase in-situ self-generating oxide nano-composite ceramic, a content of nano MAX phase oxide is 0.0002%-40%, and the rest is nano MAX phase ceramic.

12. The method for preparing oriented nano MAX phase ceramic or MAX phase in-situ self-generating oxide nano-composite ceramic according claim 11, wherein an oxide content in the oriented nano MAX phase ceramic or MAX phase in-situ self-generating oxide nano-composite ceramic is controlled by an oxygen content of the powder form or the embryo form being used, an obtained crystal grain size is controlled by a particle size of the nanosheet-layered particles and powder sintering parameters, and a degree of orientation of the obtained ceramic is controlled by different combinations and parameters of a pressing method and a sintering method.

* * * * *